(12) United States Patent
Gao et al.

(10) Patent No.: US 7,678,863 B2
(45) Date of Patent: Mar. 16, 2010

(54) PROTON EXCHANGE MEMBRANE MATERIALS BASED ON SULFONATED POLY (PHTHALAZINONES)

(75) Inventors: Yan Gao, Montreal (CA); Michael D. Gulver, Ottawa (CA); Gilles P. Robertson, Hull (CA); Xigao Jian, Dallan (CN)

(73) Assignee: National Research Council of Canada (CA)

( * ) Notice: Subject to any disclaimer, the term of this patent is extended or adjusted under 35 U.S.C. 154(b) by 967 days.

(21) Appl. No.: 10/529,020

(22) PCT Filed: Sep. 25, 2003

(86) PCT No.: PCT/CA03/01399

§ 371 (c)(1),
(2), (4) Date: Oct. 6, 2005

(87) PCT Pub. No.: WO2004/029132

PCT Pub. Date: Apr. 8, 2004

(65) Prior Publication Data

US 2006/0155127 A1 Jul. 13, 2006

(30) Foreign Application Priority Data

Sep. 25, 2002 (US) .................. 60/413,140

(51) Int. Cl.
*C08G 73/06* (2006.01)
*C08J 5/20* (2006.01)
*C08J 5/22* (2006.01)
*B01J 39/18* (2006.01)
*H01M 8/10* (2006.01)

(52) U.S. Cl. .................. 525/417; 429/33; 429/42; 521/26; 521/27; 521/30

(58) Field of Classification Search .................. 525/417
See application file for complete search history.

(56) References Cited

U.S. PATENT DOCUMENTS 3,528,858 A * 9/1970 Hay et al. .................. 429/33

(Continued)

OTHER PUBLICATIONS

Larminie et al. Larminie, James; Dicks, Andrew Fuel Cell Systems Explained (2nd Edition). John Wiley & Sons. Online version available at: http://knovel.com/web/portal/browse/display?_EXT_KNOVEL_DISPLAY_bookid=1109&VerticalID=0.*

(Continued)

*Primary Examiner*—Randy Gulakowski
*Assistant Examiner*—Mike Dollinger
(74) *Attorney, Agent, or Firm*—Ira S. Dorman

(57) ABSTRACT

A novel class of proton exchange membrane materials, sulfonated poly(phthalazinones), were prepared by modification of poly(phthalazinone). Sulfonation reactions were conducted at room temperature using mixtures of 95-98% concentrated sulfuric acid and 27-33% fuming sulfuric acid with different acid ratios in order to get SPPEK with degree of sulfonation (DS) in the range of 0.6 to 1.0. The presence of sulfonic acid groups was confirmed by FT-IR analysis, and the DS and structures were characterized by NMR. The introduction of sulfonic groups into the polymer chains led to an increase in the glass transition temperature and a decrease in the decomposition temperature. Membrane films were cast from solution in N,N-dimethylformamide or N,N-dimethylacetamide. Water uptakes and swelling ratios of the membrane films increased with DS and sulfonated polymers with DS>1.2 were water soluble at 80° C. Proton conductivity increased with DS and temperature up to 95° C., reaching $10^{-2}$ S/Cm.

6 Claims, 5 Drawing Sheets

U.S. PATENT DOCUMENTS 5,989,742 A * 11/1999 Cabasso et al. ............... 429/33
6,214,488 B1 * 4/2001 Helmer-Metzmann et al. ... 429/29
6,355,149 B1 * 3/2002 Soczka-Guth et al. ....... 204/296

OTHER PUBLICATIONS

Xiao et al. Guyu Xiao, Guomin Sun, Deyue Yan. Polyelectrolytes for Fuel Cells Made of Sulfonated Poly(phthalazinone ether ketone)s. Macromolecular Rapid Communications. vol. 23 Issue 8 pp. 488-492. Available May 2002.*

ISR X reference. Guyu Xiao, Guomin Sun, Deyue Yan, Pinfang Zhu and Ping Tao. Synthesis of sulfonated poly(phthalazinone ether sulfone)s by direct polymerization. Polymer, vol. 43 pp. 5335-5339. Available online Aug. 1, 2002.*

Dai et al. Ying Dai, Xigao Jian, Xianming Liu, Michael D. Guiver. Synthesis and characterization of sulfonated poly(phthalazinone ether sulfone ketone) for ultrafiltration and nanofiltration membranes. Journal of Applied Polymer Science, vol. 79 issue 9, 1692.*

* cited by examiner

US 7,678,863 B2

PROTON EXCHANGE MEMBRANE MATERIALS BASED ON SULFONATED POLY (PHTHALAZINONES)

BACKGROUND OF THE INVENTION

In recent years, polymer electrolyte fuel cells have been identified as promising power sources for vehicular transportation and other applications requiring clean, quiet and efficient portable power. As a vital part of the fuel cell, proton exchange membranes (PEM)s have become a rapidly growing area of research. Until now, PEMs have been mainly limited to perfluorinated ionomer membranes such as Nafion™ developed by DuPont and similar membranes commercialized by Dow and Asahi. In spite of their outstanding properties such as excellent proton conductivity and oxidative resistance, which are essential for fuel cell application, the perfluorinated ionomer membranes are very expensive (US$800-2000/m$^2$) and suffer from other serious drawbacks of high methanol permeation and dehydration. In order to develop alternatives to Nafion™, which would be less expensive and free from other disadvantages of perfluorinated ionomer membranes, several attempts have been recently made including synthesis of new polymer electrolytes[1-5], chemical modification of available high performance polymers[6-10], and blend membranes[11-14]. Among these studies, introducing sulfonic acid groups into the main chains of high performance polymers by sulfonation reaction is an important and widely used method for imparting polymers with proton exchange capability. Poly(aryl ether ketone)s, poly(phenylene oxide), poly(phenylene sulfide), poly(aryl ether sulfone), and polybenzimidazole are among those that have been studied. The sulfonating agents include concentrated sulfuric acid, chlorosulfonic acid, pure or complex sulfur trioxide, and acetyl sulfate. As an example, the sulfonation reaction of Victrex™ PEEK and the conductivity of sulfonated PEEK have been studied extensively[7,11,15-17]. The DS could be controlled by reaction time and temperature in concentrated sulfuric acid or oleum. For sulfonated PEEK with a relatively low DS of 0.65, its conductivity reaches 0.04 S cm$^{-1}$ at 100° C./100% RH, higher than that of Nafion-117 measured under the same conditions.

Poly(phthalazinone ether ketone) (PPEK) is one of a new class of poly(aryl ether ketone)s under consideration for commercialization. PPEK has a very high glass transition temperature of 263° C., excellent high-temperature stability, and many other good properties. The sulfonation reactions of its copolymer, poly(phthalazinone ether sulfone ketone) (PPESK), and the nanofiltration and ultrafiltration membrane properties have also been studied[18-23].

SUMMARY OF THE INVENTION

According to the invention, the sulfonation reaction of several poly(pthalazinones) have been investigated, and suitable PEMs acquired from the sulfonated products.

According to one aspect of the invention, a series of sulfonated poly(pthalazinone)ether ketones (PPEKs), (SPPEKs) with different DSs were prepared via modification of PPEK with the mixture of concentrated sulfuric acid and fuming sulfuric acid as the sulfonating agent. The structure and some properties of SPPEKs and resulting membrane films were characterized, including: sulfonation position, proton conductivity, equilibrium water uptake, swelling ratio and thermostability as a function of DS.

Similarly, a series of poly(pthalazinone) ether sulfone ketones(PPESKs), and poly(pthalazinone) ether sulfones (PPESs) were prepared and tested.

DETAILED DESCRIPTION OF THE INVENTION

Experimental

Materials

Figure 1:
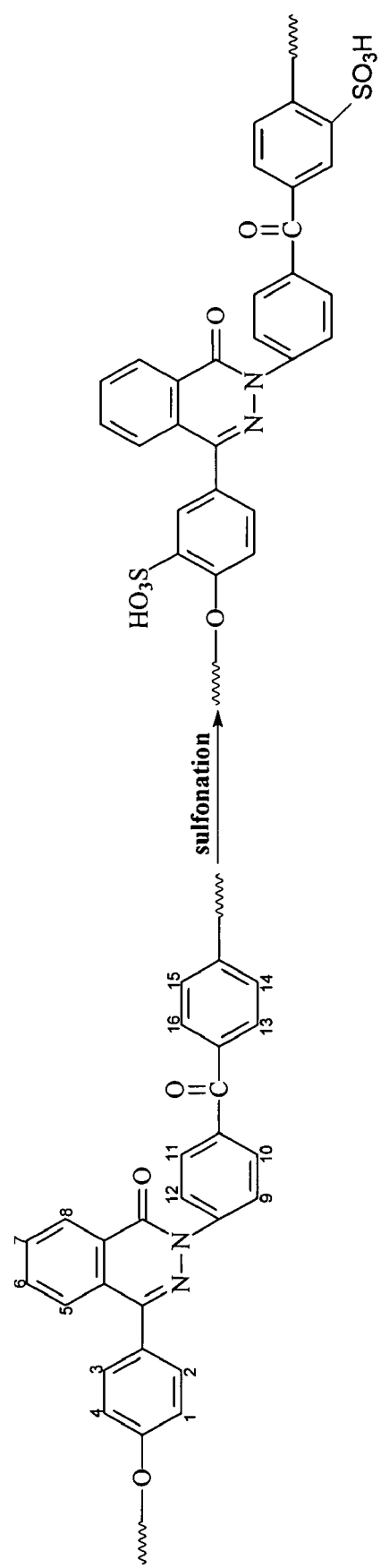
FIG. 1 is a schematic illustration of the synthetic pathway for SPPEK.

PPEK was synthesized according to the procedure reported previouslyls[18,19]. All other chemicals obtained commercially were reagent grade and used as received.

Sulfonation Reaction

In a typical small-scale experiment, 0.5 g PPEK powder was added to a 10 mL mixture of 95-98% concentrate sulfuric acid and 27-33% fuming sulfuric acid under an argon atmosphere and the mixture was magnetically stirred at room temperature (23° C.) for a certain reaction time. The reported reaction time is the total time for polymer dissolution and reaction. After a determined reaction time the reaction medium was poured onto crushed ice and the resulting precipitate was recovered by filtration, washed with deionized water until the pH value was ~6-7.

For scaled-up reactions of 30-35 g, an ice bath was needed initially to cool the heat released during dissolution. An amount of 30 g PPEK powder was added to a mixture of 240 mL 95-98% concentrated sulfuric acid and 360 mL 27-33% fuming sulfuric acid under an argon atmosphere and the mixture was magnetically stirred in an ice bath. About 0.5 h later, the ice bath was removed and the stirring was continued at room temperature (23° C.). $^1$H-NMR was used to trace the DSs. After a determined reaction time, the reaction medium was poured onto crushed ice and the resulting precipitate was recovered by filtration, washed with deionized water until the pH value was ~6-7.

Polymer Analysis and Measurement

Proton and carbon spectra were obtained on a Varian Unity Inova NMR spectrometer operating at a proton frequency of 399.951 MHz and a carbon frequency of 100.578 MHz. Tetramethylsilane was used as the internal standard chemical shift reference. $^1$H-NMR spectra of PPEK and low DS SPPEK were acquired at a temperature of 22° C. in deuterated chloroform (CDCl$_3$). Deuterated methylene chloride (CD$_2$Cl$_2$) was used when accurate integration values were desired for high field aromatic signals since the signal of residual CH$_2$Cl$_2$ (5.31 ppm) did not interfere with the aromatic region. Deuterated dimethylsulfoxide (DMSO-d$_6$) was the NMR solvent of choice for higher DS SPPEK. Presaturation of the large water peak always present in SPPEK at around 4 ppm improved the spectra by increasing the signal to noise ratio and by removing interference signals from the large water absorption. $^{13}$C NMR spectra of PPEK were acquired using a 10 mm tunable broadband probe and a concentrated sample in CDCl$_3$ (500 mg in 3 mL). A quantitative spectrum was obtained using long relaxation delay and hydrogen decoupling only during the acquisition time. IR spectra were measured on a Nicolet 520 Fourier transform spectrometer with powder samples inside a diamond cell.

A TA Instruments thermogravimetric analyser (TGA) instrument model 2950 was used for measuring the degradation temperatures (T$_d$) and a TA Instruments differential scanning calorimeter (DSC) model 2920 calibrated with Tin at 231.93° C. and Zinc at 419.53° C. was used for measuring the glass transition temperatures (T$_g$). Polymer samples for TGA analysis were preheated to 150° C. at 10° C./min under nitrogen atmosphere, held isothermally for 60 min, equilibrated at 80° C., then heated to 800° C. at 10° C./min for T$_d$ measurement. Hence, the degradation data reported here were assumed to be in the absence of moisture. Samples for DSC analysis were initially heated at a rate of 10° C./min under nitrogen atmosphere to well below the polymer T$_d$ point, quenched in liquid nitrogen and then re-heated at the same rate.

Inherent viscosities were determined using an Ubbelohde viscometer for N,N-dimethylformamide solutions of polymer with a concentration of 0.5 g/dL at 30° C.

Preparation of Membrane Films

An amount of 0.7 g sample was dissolved in 12 mL of N,N-dimethylforniamide (DMF) or N,N-dimethylacetamide (DMAc) and filtered. The filtered solution was poured onto a glass plate and dried at 40° C. for about two days. Residual solvent was further evaporated at 120° C. under vacuum for 48 h, resulting in yellow membrane films.

Water Uptake Content Measurement and Swelling Ratio

All polymer membranes used were vacuum dried at 120° C. before test. The sample films were soaked in deionized water for different time at determined temperatures. Weights of dry and wet membranes were measured. The water uptake content was calculated by $$\text{Uptake content (\%)} = \frac{\omega_{wet} - \omega_{dry}}{\omega_{dry}} \times 100\%$$

Where $\omega_{dry}$ and $\omega_{wet}$ are the masses of dried and wet samples respectively. The swelling ratio was calculated from films 7~10 cm long by:

$$\text{Swelling Ratio (\%)} = \frac{l_{wet} - l_{dry}}{l_{dry}} \times 100\%$$

Where $l_{dry}$ and $l_{wet}$ are the lengths of dry and wet samples respectively.

Conductivity

The proton conductivity was measured by AC impedance spectroscopy over a frequency range of 1-10$^7$ Hz with oscillating voltage 50-500 mV, using a system based on a Solarton 1260 gain phase analyzer. A sample with diameter 10 mm was placed in an open, temperature controlled cell, where it was clamped between two blocking stainless steel electrodes with a permanent pressure of about 3 kg/cm$^2$. Specimens were soaked in deionized water prior to the test. The conductivity ($\sigma$) of the samples in the transverse direction was calculated from the impedance data, using the relation $\sigma = d/RS$ where d and S are the thickness and face area of the sample respectively and R was derived from the low intersect of the high frequency semi-circle on a complex impedance plane with the Re (Z) axis.

Results and Discussion

Sulfonation Reaction

FIG. 1 shows the sulfonation reaction, whereby sulfonation occurs as expected around the electron-donating ether linkage.

In general, sulfonation of polymers can be conducted with several sulfonating agents, including concentrated sulfuric acid, fuming sulfuric acid, chlorosulfonic acid and acetyl sulfate, depending on the reactivity of the polymer. For Victrex PEEK, a high DS can be achieved with concentrated sulfuric acid because of the high reactivity of the hydroquinone segment in the polymer chain. We initially attempted the sulfonation of PPEK in 95-98% concentrated sulfuric acid at both room and elevated temperatures. However, the results listed in Table 1 show that almost no sulfonation of PPEK took place at room temperature even for a very long reaction time, and only SPPEK with a very low DS was obtained at 60° C. after 60 h. Sulfonation is an electrophilic reaction affected by both the electrophilicity of the sulfonating agent and the electron donating characteristics of polymer. Compared with PEEK, PPEK (as shown in FIG. 1) has more electron-withdrawing functionality per repeat unit, which decreases the reactivity of the electron-donating ether linkage of the polymer. In order to prepare SPPEK with a high DS, 27-33% fuming sulfuric acid and elevated reaction temperature were employed. As shown in Table 1, the sulfonation of PPEK in oleum at 40° C. for 1 h resulted in SPPEK with a DS of 1.6. The DS didn't increase significantly over extended reaction times. This is because the sulfonic acid groups are more than 1.5 per repeating unit, reducing the electron-donating characteristic of the polymer and preventing the further introduction of more sulfonic acid groups. Although a high DS was achieved using fuming sulfuric acid, the reaction proceeded too rapidly to maintain control. Abating the reaction to room temperature reduced the DS to 1.3. However, at a DS of 1.3, SPPEK is water soluble and can not be used as a PEM in fuel cell where high humidity exists. A further reduction in temperature made the PPEK solution in fuming sulfuric acid too viscous to completely dissolve the polymer, which may result in a heterogeneous sulfonation reaction. In order to reduce the reactivity of the sulfonating agent, a mixture of 95-98% concentrated sulfuric acid and 27-33% fuming sulfuric acid was used for PPEK. As seen in Table 1, by varying the ratio of concentrated sulfuric acid to fuming sulfuric acid and the reaction time, the sulfonation reaction was more readily controlled to different DSs in the range of 0.6 to 1.23.

TABLE 1

Dependence of DS on the reaction conditions

| Oleum/Concentrated sulfuric acid | Reaction temperature (° C.) | Reaction time (h) | DS |
|---|---|---|---|
| 0/10 | R.T. | 95 | ~0 |
|  | 60 | 6 | <0.1 |
| 4/6 | R.T. | 4 | 0.1 |
| 5/5 | R.T. | 1 | 0.6 |
|  |  | 4 | 0.8 |
|  |  | 7 | 0.9 |
| 6/4 | R.T. | 1 | 0.8 |
|  |  | 4 | 1.0 |
|  |  | 7 | 1.1 |
| 7/3 | R.T. | 1 | 1.0 |
|  |  | 4 | 1.2 |

TABLE 1-continued

Dependence of DS on the reaction conditions

| Oleum/Concentrated sulfuric acid | Reaction temperature (° C.) | Reaction time (h) | DS |
|---|---|---|---|
| 10/0 | R.T. | 1 | 1.3 |
|  | 40 | 1 | 1.6 |
|  |  | 2 | 1.6 |
|  |  | 23 | 1.7 |

Reaction conditions: PPEK 0.5 g, mixture of sulfuric acid 10 mL, argon atmosphere. R.T.: Room Temperature

NMR

Figure 2:
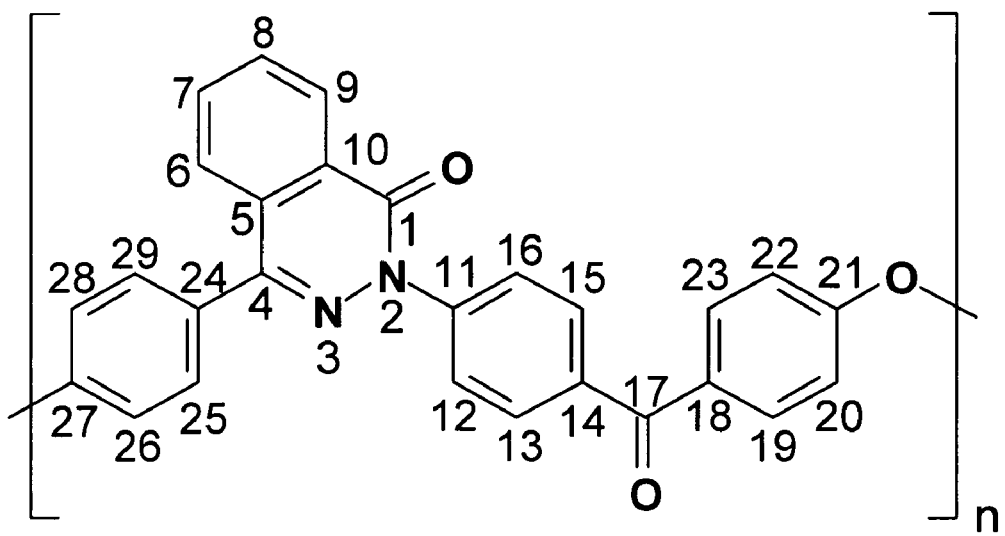
FIG. 2 is an illustration of the structural formula of PPEK.
Figure 3:
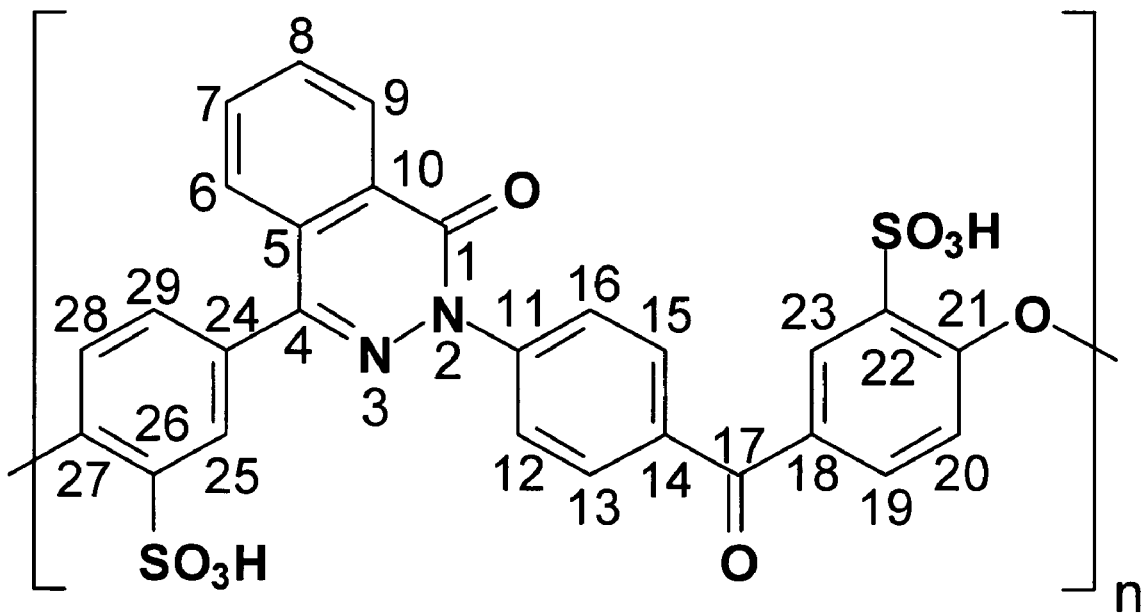
FIG. 3 is an illustration of the structural formula of SPPEK.

In order to determine the sulfonation site and the DS quantitatively, the $^1$H-NMR spectra of PPEK in CDCl$_3$ and SPPEK in DMSO-d$_6$ were characterized. The number system adopted for the protons in the polymer and the derivatives are shown in FIGS. 2 and 3. The careful and accurate assignments of NMR spectral signals was essential for determining both the DS and the site of sulfonation.

The starting point for peak assignment of $^1$H and $^{13}$C-NMR of PPEK was from the absorptions resulting from atoms surrounding the electron rich ether moiety. In a PPEK repeat unit, the hydrogen atoms at the ortho position to the ether linkage are more shielded than any other hydrogen atoms due to resonance effect of the oxygen lone pair electrons. The other functional groups present in PPEK have a deshielding effect on nearby nuclei. As a result of that, the furthest upfield signals (7.08-7.30 ppm) arise from the 4H ortho to the ether linkage. 2D COSY NMR as well as simple homonuclear decoupling experiments showed the presence of two separate spin coupling systems originating from these high field signals. These interactions are a result of spin-spin coupling between the hydrogen atoms at the ortho and meta positions of these phenol rings. One spin system consists of the high field ortho ether 2H absorption at 7.16-7.30 ppm coupled with the distinct signal at 7.60-7.72 ppm. The other spin system consists of the high field ortho ether 2H absorption at 7.08-7.16 ppm coupled with the multiple absorptions at 7.76-8.06 ppm.

The results of a simple $^{13}$C-NMR experiment allowed formal assignment of the preceding hydrogen signals, which are key components for the accurate measurement of the DS of SPPEKs. In the H-decoupled $^{13}$C-NMR spectrum of PPEK, not shown, the carbon peaks of particular interest are the ones arising from carbon atoms directly linked to an electron-withdrawing heteroatom (N or O) causing absorptions to appear at lower field (144-195 ppm). The furthest downfield signal (193.6-194.8 ppm) is unequivocally from the ketone carbon. Further upfield, three carbon signals (155-162 ppm) arise from carbon atoms linked to electronegative oxygen atoms in the phthalazinone and ether functionalities. Finally, the less electronegative nitrogen atoms give the carbon absorptions at higher field (144-148 ppm). In one $^{13}$C-NMR experiment, a spectrum was acquired with decoupling of one of the hydrogen frequencies (7.60-7.72 ppm) responsible for the 2H at the meta position of one of the phenol rings. The resulting spectrum was compared with a $^{13}$C-NMR spectrum acquired with full hydrogen coupling. Of all the downfield carbon signals, the C-O absorption at 156.0-157.1 ppm and the C-N at 147.0-148.0 ppm both lost a 6-7 Hz long range (3 bond C-C-C-H) carbon-hydrogen coupling when the hydrogen frequency 7.60-7.72 ppm had been irradiated. Hence, the long-range C-H interaction could only originate from C(O)-27 coupled with H-25,29 and C(N)-4 coupled with H-25,29. Decoupling of the other meta-ether hydrogen atoms H-19,23 would not affect any of the 2 C—N carbons. This experiment leads to the unequivocal assignment of H-20,22 and H-26,28 which are essential for the DS calculations. The assignment of H-25,29 and H-19,23 were also derived from this experiment. Further 1D and 2D heteronuclear (C and H) NMR experiments confirmed the previous assignments. Table 2 and 3 list the chemical shift of the $^1$H and $^{13}$C-NMR spectra of PPEK respectively.

TABLE 2

$^1$H-NMR data of PPEK in CDCl$_3$

| Proton Number | Chemical shift δ (ppm) | Integral intensity (number of H) |
|---|---|---|
| H-6,7,8,9,12,13,15,19,23 | 7.76–8.06 | 9H |
| H-16 | 8.54–8.68 | 1H |
| H-20,22 | 7.08–7.16 | 2H |
| H-25,29 | 7.60–7.72 | 2H |
| H-26,28 | 7.16–7.30 | 2H |

TABLE 3

$^{13}$C-NMR data of PPEK (hydrogen decoupled) in CDCl$_3$.

| Carbon Number | Chemical shift δ (ppm) |
|---|---|
| C-1 | 158.72 |
| C-4 | 147.0–148.0 |
| C-5–10,12–16,18,19,23–25,29 | 125.0–137.0 |
| C-11 | 144.8–146.0 |
| C-17 | 193.6–194.8 |
| C-20,22 | 117.6–118.6 |
| C-21 | 160.2–161.4 |
| C-26,28 | 119.4–120.4 |
| C27 | 156.0–157.1 |

The hydrogen absorption at low field (8.54-8.68 ppm) is strongly believed to arise from H-16 although it could not be formally proved. The chemical shift position of many peaks in $^1$H and $^{13}$C-NMR spectra is seen to be not averaged out as would be the case where free rotation occurs. It is believed that PPEK is hindered by restricted rotation around certain linkages. In a "restricted" structure, H-16 would have an intensity of 1, as observed, and also would be in close proximity to the phthalazinone carbonyl. The proximity to the carbonyl would deshield H-16 more than any other hydrogen atoms nearby one of the carbonyl groups of PPEK.

DS Calculations From $^1$H-NMR:

A $^1$H-NMR of PPEK in CD$_2$Cl$_2$ was acquired and the integration value of the upfield H-26,28 and H-20,22 absorptions was set to 4.00. The integration values of the other regions of the spectra corresponded exactly (table 2) to the number of hydrogen atoms expected from the chemical structure of PPEK repeat unit. Similarly, in a quantitative $^{13}$C-NMR experiment, the upfield carbon signals C-26,28 and C-20,22 were also set to an intensity of 4.00 and the integration values of the other peaks again matched precisely. Sulfonated PPEK is only soluble in highly polar solvents and DMSO-d$_6$ was chosen to dissolve SPPEK. Spectra of SPPEK DS 1.03 and 1.63 are not shown. In comparison with PPEK, several new signals for the SPPEK derivatives appear with different chemical shifts due to the different solvents used and perturbation by different DSs of —SO$_3$H groups. The ortho-ether hydrogen atoms remained at high field but their intensity decreased as they were replaced by —SO$_3$H groups. More importantly, the ratio of low field H-16 (8.40-8.55) ppm to multiple peaks 7.60-8.40 ppm (which do not include ortho-ether protons) always remained 1.00:11.00 for low and high sulfonation degrees. This is proof that substitution occurred only at the ortho-ether sites of the PPEK repeat unit. Another phenomenon supporting this is the variation in size of the small high-field signal at 7.30-7.40 ppm due to mono-substitution on SPPEK repeat units. When strong electron withdrawing sulfonic acid groups are attached to benzene rings, they induce deshielding of hydrogen in the ortho and para positions. In monosubstituted SPPEK (DS~1), H-20 is deshielded by the —$SO_3H$ group hence shifted downfield.

In disubstituted SPEEK repeat units (DS>1), H-20 is still deshielded by the —$SO_3H$ group present on the phenol ring but it is also shielded by the proximity through space of the electron-rich oxygen atoms of the other —$SO_3H$ group nearby on the other phenol ring. The DS was simply measured by presetting the integration value of the low field hydrogen absorptions to 12H (7.50-8.60 ppm) and determining the intensity value of the upfield hydrogen signals. This value represents the number of hydrogen atoms that have not been converted into —$SO_3H$ groups and therefore subtracting it from 4H (unmodified PPEK) gives a direct DS value for SPPEK.

FT-IR

Figure 4:
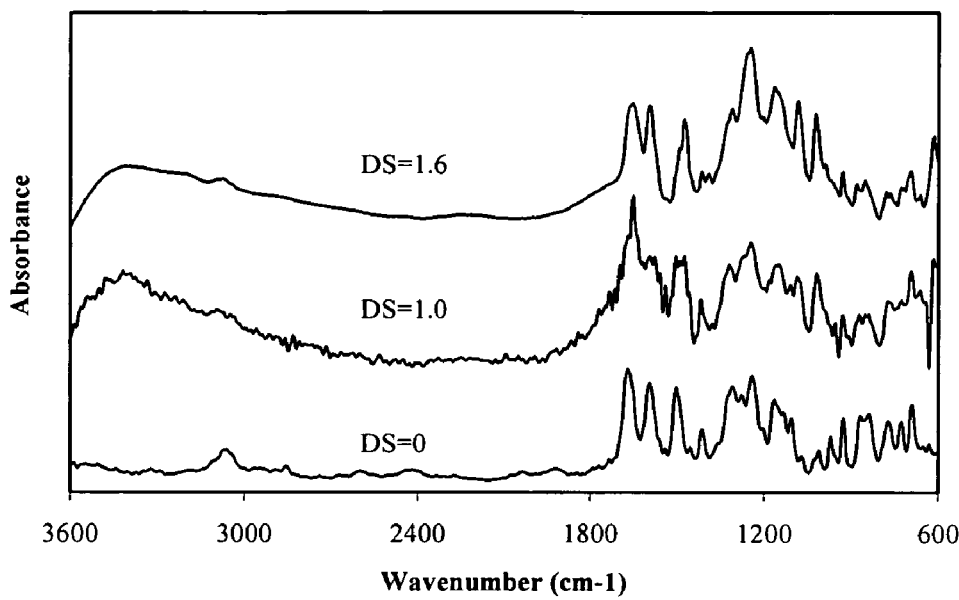
FIG. 4 is a FT-IR spectra of PPEK and SPPEK.

Fourier Transform Infrared (FT-IR) Spectroscopy was used to confirm the pendant $SO_3H$ group on the polymer chain. FIG. 4 shows the FT-IR spectra of parent PPEK and its sulfonated derivatives with DSs of 1.03 and 1.63 respectively. In comparing these spectra, one can see that in addition to the predicable absorptions at 3400 $cm^{-1}$ due to the stretching of the hydroxyls of $SO_3H$ groups, the SPPEK absorption bands at 1020 and 1081 $cm^{-1}$ are characteristic of the aromatic $SO_3H$ symmetric and asymmetric stretching vibrations respectively. These two characteristic peaks increase with higher DS. In addition, the reaction can be readily followed by the signal at 1500 $cm^{-1}$ related to 1,4-aromatic ring substitution. Introduction of $SO_3H$ onto the aromatic ring induces the formation of two new adsorptions at 1471 and 1475 $cm^{-1}$, which at higher sulfonation degree, completely replace the adsorption at 1500 $cm^{-1}$. The introduction of sulfonic acid groups in the modified polymer is thus confirmed.

Thermal Analysis

Figure 5:
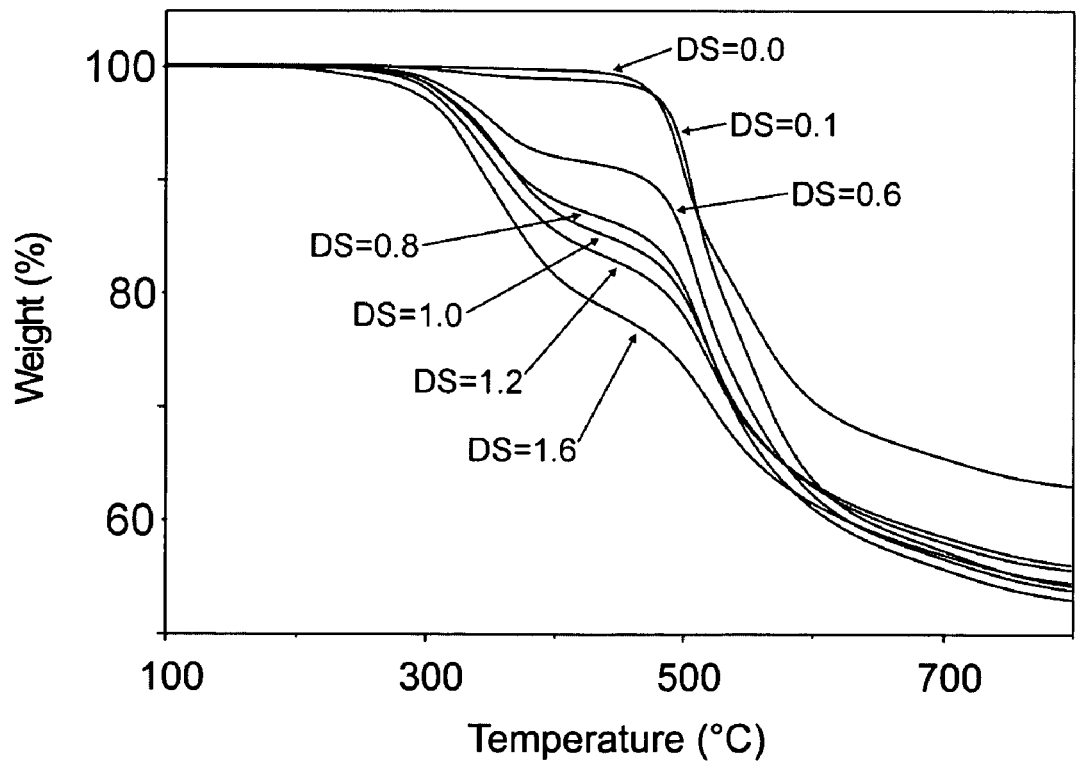
FIG. 5 is a graph illustrating TGA traces of PPEK and SPPEKs.

The thermal stabilities of the SPPEKs were determined by TGA. All the samples were preheated at 150° C. for 60 min in the TGA furnace to remove moisture, then dynamic TGA experiments were run from 80 to 800° C. at a heating rate of 10° C./min under nitrogen. FIG. 5 shows the degradation curves. The parent PPEK is a thermostable polymer of which the 5 wt % loss temperature is nearly 500° C. For the sulfonated PPEK, there are two transitions of loss in weight. The first one occurs at about 300° C. and could be ascribed to the decomposition of the $SO_3H$ groups. In order to confirm our speculation, the weight loss from the initial point to 455° C. of SPPEK with DS of 1.0 was analyzed. A value of about 15% was obtained, which is close to the theoretical $SO_3H$ weight loss percentage of 16% in SPPEK with DS of 1.0. The second thermal degradation at about 490° C. is assigned to the degradation of the main polymer chain, which is in close agreement to the weight loss step in the TGA curve for parent PPEK. In addition, SPPEKs with higher DS lose weight more quickly than those with lower DS, in the temperature range of 300 to 460° C. It also indicates that the weight loss during this period is due to the elimination of —$SO_3H$ groups.

The $T_g$ of starting material is 263° C. For sulfonated product, only the $T_gS$ of SPPEKs with DSs of 0.1 and 0.6 have been detected at 270° C. and 292° C., respectively. The introduction of sulfonic groups into polymer chains leads to increased $T_gS$ because of the increased intermolecular ionic interactions. For SPPEK with DS higher than 0.6, no $T_gS$ have been detected because the decomposition temperatures are lower than the $T_gS$.

Solubility and Viscosity

PPEK is soluble in $CHCl_3$, chlorobenzene and some other chlorinated solvents, but insoluble in polar aprotic solvents such as N,N-dimethylformamide (DMF), N,N-dimethylacetamide (DMAc) and dimethylsulfoxide (DMSO). SPPEK with low DS, such as DS of 0.1 has similar solubility characteristics to the parent polymer. However, SPPEKs with high DSs are soluble in these dipolar aprotic solvents, but insoluble in chlorinated solvents. DMF was chosen as the solvent for determining the inherent viscosities [η] of SPPEKs with high DS, which are listed in Table 4. It shows that the inherent viscosities of SPPEKs are higher compared with that of PPEK of 0.6 in chloroform and generally increase with increasing DS suggesting that the polymer chain is not degraded during sulfonation. Only SPPEK with DS of 1.63 which is obtained with 27-33% fuming sulfuric acid had a slightly reduced viscosity. A significant increase in the viscosity may arise from two factors: one is that the introduction of sulfonic acid into polymer chain caused an overall increase in the polymer molecular weight; the other is that hydrogen bonding related to sulfonic acid groups increases the molecular forces. The slight decrease in the viscosity of SPPEK with DS of 1.63 may be caused by degradation taking place during the sulfonation reaction in undiluted fuming sulfuric acid.

TABLE 4

Inherent viscosities of SPPEK

| DS | [η] dL/g |
|---|---|
| 0 | $^a$0.6 |
| 0.6 | 1.40 |
| 0.8 | 1.81 |
| 1.0 | 1.83 |
| 1.2 | 1.99 |
| 1.6 | 1.88 |

Determination conditions: SPPEK 0.5 g/dL in DMF, 30° C.
$^a$In chloroform

Water Uptake and Swelling Ratio

Adequate hydration of membranes is critical to fuel cell application. Water assists in the transportation of protons from the anode to the cathode. If the electrolyte membrane is too dry, its conductivity falls; on the other hand, excess water results in cathode flooding and morphological instability of membrane. The water uptake and swelling ratio of SPPEK membranes were determined by measuring the change in the mass and length before and after hydration. The results are listed in Table 5, which show that the water uptake of SPPEK increases with the DS at both room temperature and elevated temperature. At 80° C., water uptake and swelling ratio of SPPEKs with lower DS reach equilibrium values quickly. However, water uptake and swelling ratio of SPPEK with DS≧1 increase with time and some samples were swollen or dissolved in water. The molecular structure of SPPEK is composed a hydrophobic backbone and hydrophilic sulfonic acid groups. Absorbed water acts also as plasticizer, which promotes the phase separation. When the DS is are high enough, it becomes easy for the SPPEK chains to be separated by water and dissolved.

TABLE 5

Water uptake and swelling ratio of SPPEK

| | Room temperature | 80° C. | | | |
| | | 2 h | | 24 h | |
| DS | 3 days Water uptake (%) | Water uptake (%) | Swelling ratio (%) | Water uptake (%) | Swelling ratio (%) |
| --- | --- | --- | --- | --- | --- |
| 0.1 | 6 | 14 | 2.4 | 14 | 2.4 |
| 0.6 | 15 | 16 | 3.6 | 16 | 3.6 |
| 0.8 | 19 | 21 | 6.4 | 22 | 6.4 |
| 1.0 | 19 | 44 | 12 | 63 | 20 |
| 1.2 | 32 | Swelling | Dissolved | — | — |
| 1.6 | 100 | Dissolved | — | — | — |

Proton Conductivity

Figure 6:
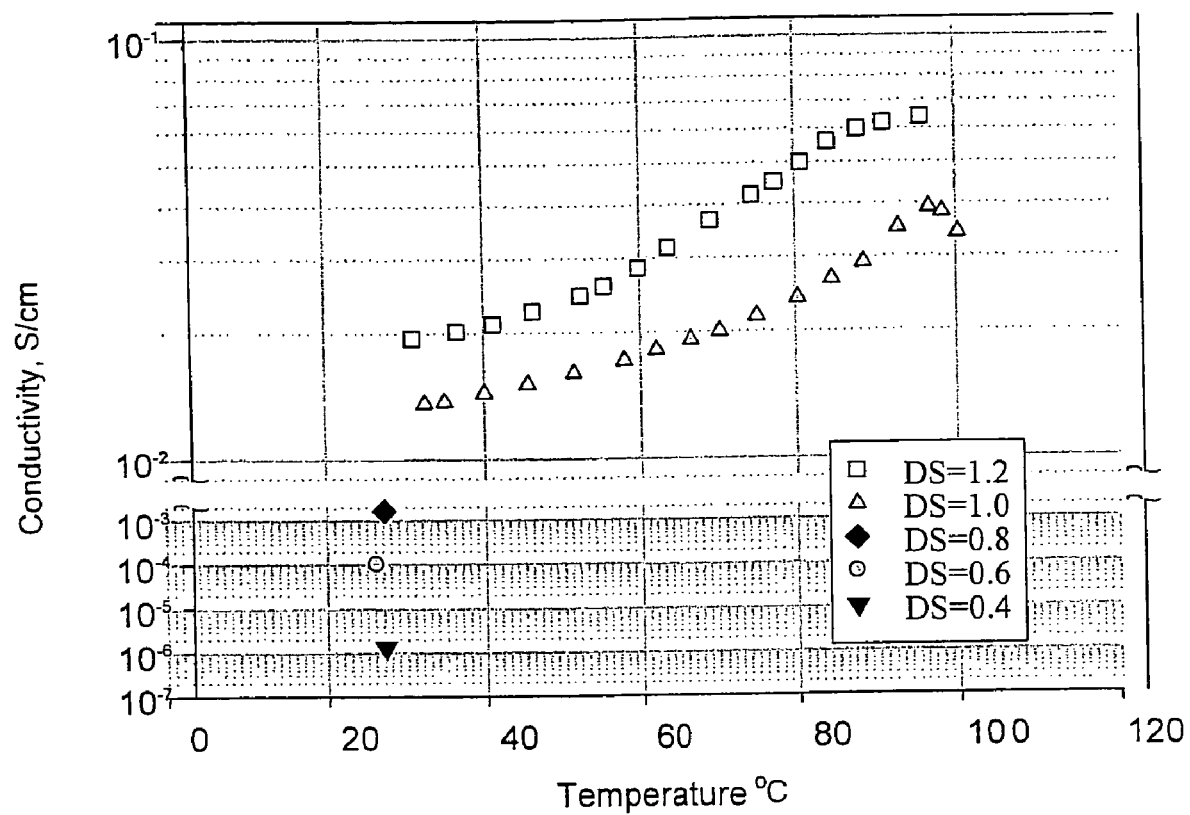
FIG. 6 is a graph of Conductivity of SPPEKs of various DS.

Prior to conductivity measurements, all membrane samples were soaked in water 1 or 2 days for hydration. The effect of the DS on the conductivity of SPPEK is shown in FIG. 6, which shows that the conductivity of SPPEK at room temperature increases with DS and reaches $2\times10^{-2}$ S/cm for SPPEK with DS of 1.2. This value is similar to Nafion 117, which shows conductivity of $3\times10^{-2}$ S/cm. FIG. 6 also shows the influence of temperature on the conductivity for DS 1.0 and 1.2 SPPEKs. As can be seen, the conductivities of these two SPPEKs increase with increasing temperature up to 95° C. and reach $4\times10^{-2}$ S/cm and $6\times10^{-2}$ S/cm, respectively. Conductivity of SPPEK with DS of 1.0 drops sharply after that, which is probably caused by the dehydration of membrane. Compared with Nafion 117, the drop in conductivity at 80° C. occurs at a higher temperature for SPPEK.

CONCLUSIONS

A series of SPPEKs with different DS were prepared from PPEK with a mixtures of fuming and concentrated sulfuric acid as both the solvent and sulfonating agent. The Structure of SPPEK was confirmed by FT-IR and the DS of SPPEK was determined by $^1$H-NMR. As the DS of SPPEK increases, $T_d$ decreased and $T_g$ increased. Membrane films prepared from SPPEKs show a continuous increase in water uptake and swelling ratio with DS. Membranes prepared form SPPEK with DS of 1.0 and 1.2 show attractively high conductivity of $10^{-2}$ S/cm at both room temperature and elevated temperature.

Data for SPPES and SPPESK Prepared by Sulfonating PPES and SPPESK Respectively

Sulfonation Reaction of SPPES

An amount of 2 g PPES powder was added to a mixture of 16 mL 95-98% concentrated sulfuric acid and 24 mL 27-33% fuming sulfuric acid under an argon atmosphere and the mixture was magnetically stirred in an ice bath. About 15 min later, the ice bath was removed and the stirring was continued at room temperature (23° C.). $^1$H-NMR was used to trace the DSs. After a determined reaction time, the reaction medium was poured onto crushed ice and the resulting precipitate was recovered by filtration, washed with deionized water until the pH value was ~6-7.

Sulfonation Reaction of SPPESK

An amount of 2 g PPESK powder was added to a mixture of 16 mL 95-98% concentrated sulfuric acid and 24 mL 27-33% fuming sulfuric acid under an argon atmosphere and the mixture was magnetically stirred in an ice bath. About 15 min later, the ice bath was removed and the stirring was continued at room temperature (23° C.). $^1$H-NMR was used to trace the DSs. After a determined reaction time, the reaction medium was poured onto crushed ice and the resulting precipitate was recovered by filtration, washed with deionized water until the pH value was ~6-7.

Conductivity

Figure 7:
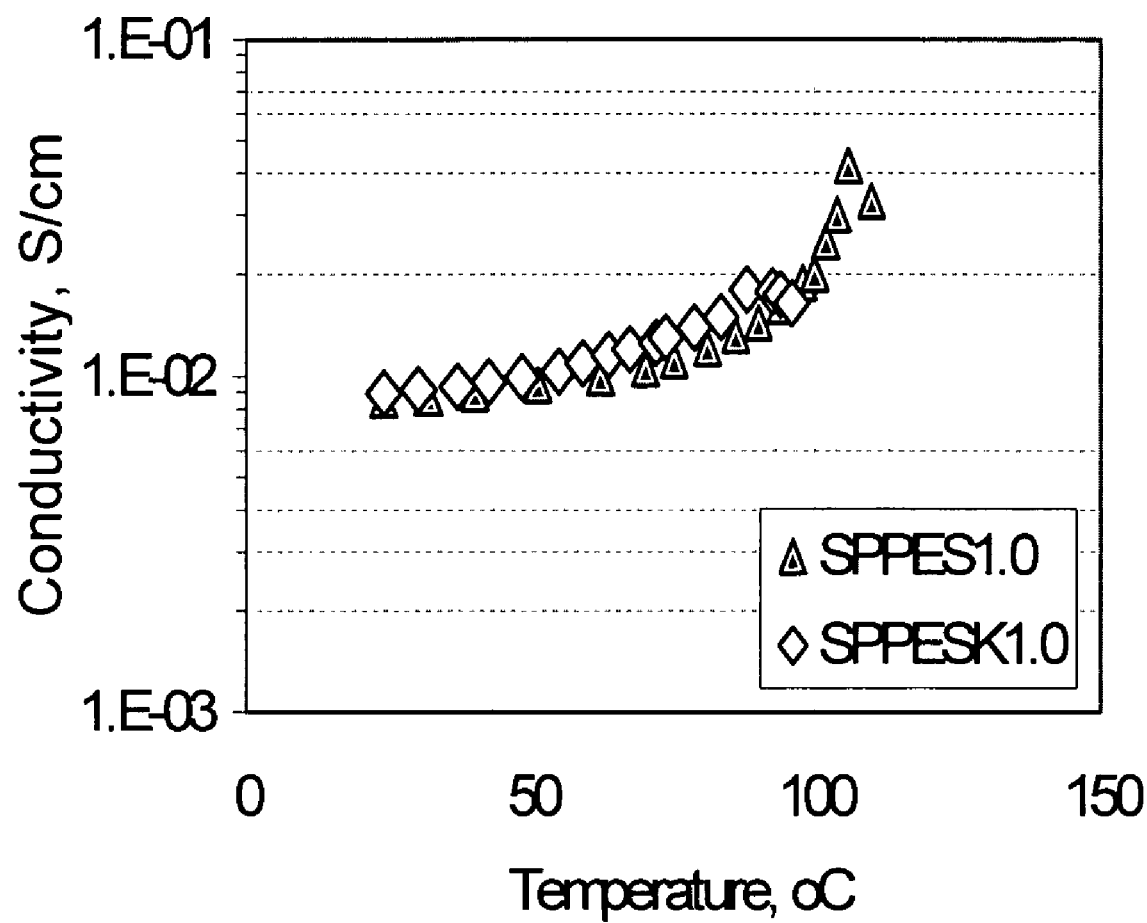
FIG. 7 is a graph of Conductivity versus temperature for SPPES and SPPESK.

Prior to conductivity measurements, all membrane samples were soaked in water 1 or 2 days for hydration. FIG. 7 shows the influence of temperature on the conductivity for SPPES and SPPESK with DS 1.0. As can be seen, the conductivity of SPPESK increases with increasing temperature up to 95° C. and reaches $2\times10^{-2}$ S/cm, then drops sharply after that, which is probably caused by the dehydration of membrane. The conductivity of SPPES increases with increasing temperature up to 106° C. and reaches $4\times10^{-2}$ S/cm, then drops. Compared with Nafion 117, the drop in conductivity at 80° C. occurs at a higher temperature for SPPEK.

Proton Conductivity

Data for SPPEK Prepared by Polymerization of Sulfonated Monomers (This demonstrates that there are alternative methods of producing poly(phthalazinones)

The random sulfonated poly(phthalzinone ethers) have also been obtained via direct polymerization reactions with the sulfonation sites on the deactivated aromatic rings as depicted in scheme 1.

Polymerization Reaction

The SPPEKs synthesized with various compositions are denoted as SPPEK-n, where n means the percentage content of SDFK in feed of DFK and SDFK. The synthesis of SPPEK-50 is used as a typical example. To a three-neck flask with a magnetic stirrer, a Dean-Stark trap and condenser, and an Argon inlet, 1.102 g DFK (5.05 mmol), 2.133 g SDFK-Na (5.05 mmol), 2.383 g DHPZ (10 mmol), and 1.8 g potassium carbonate (13 mmol) were added. Then 18 mL of NMP and 25 mL chlorobenzene were charged into the reaction flask under an argon atmosphere. The reaction mixture was heated to 140° C. Upon dehydration and removal of chlorobenzene, the reaction temperature was increased to 170-175° C. After a period of 5-7 h, when the solution viscosity had obviously increased, several milliliters of NMP was added to dilute the solution and kept it for further 3-5 h. Then, the mixture was cooled to 100° C. and coagulated in ethanol, water or acetone. After recovering and drying the product, SPPEKs were purified by dialysis for 7 days, using a membrane-cellulose dialysis tube (SPECTRUM) with a molecular weight cut off value of 3500.

Preparation of Membrane Films

An amount of 1 g SPPEK in sodium form was dissolved in 12 mL of N,N-dimethylacetamide (DMAc) and filtered. The filtered solution was poured onto a glass plate and dried at 40° C. for about two days. Residue solvent was further evaporated at 120° C. under vacuum for 48 h. resulting in yellow membrane films. The acid form membrane films were obtained by doping the sodium form membrane films into 2 N $H_2SO_4$ for 48 h, followed by doping in deionized water for 48 h, and vacuum drying at 100° C. for 24 h.

Scheme 1
Synthetic formula for SPPEK

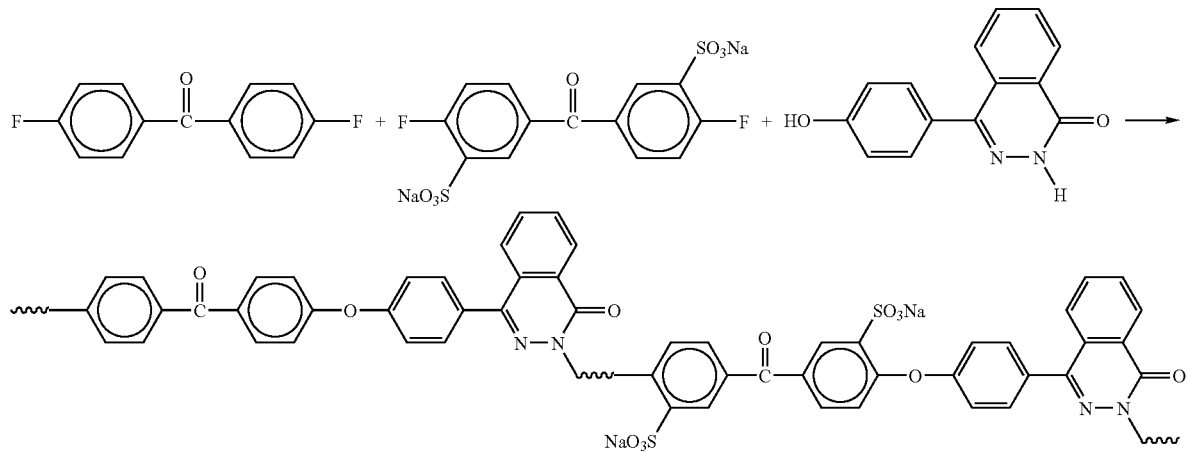

Scheme 2
Preparing H-form membranes

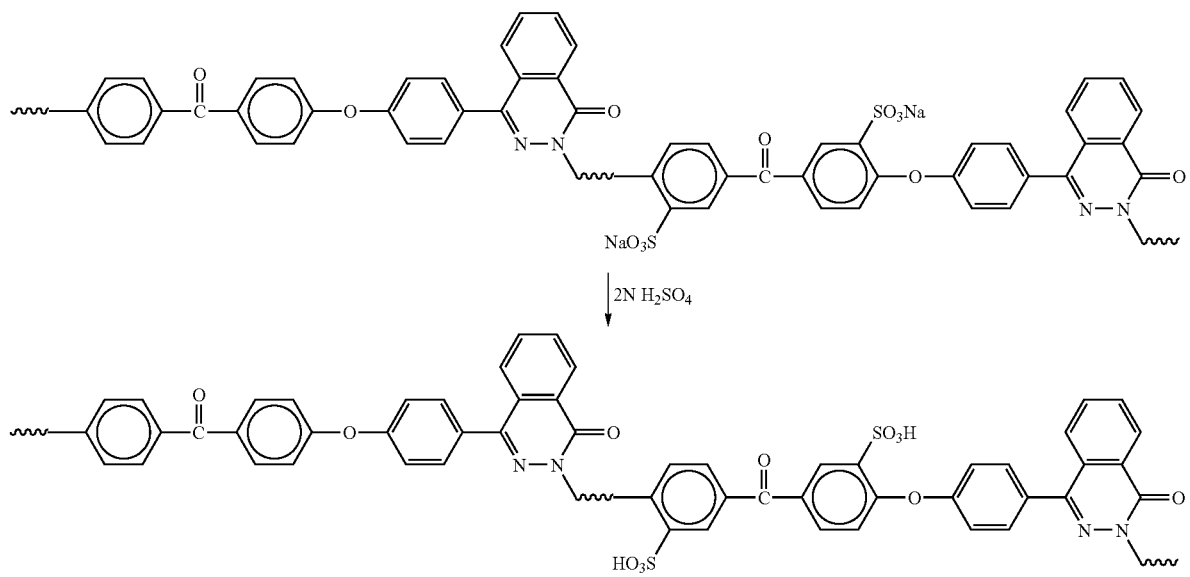

REFERENCES

1. Ueda, M.; Toyota, H.; Ouchi, T.; Sugiyama, J.; Yonetake, K.; Masuko, T.; Teramoto, T. J Polym Sci Polym: Part A: Chem Ed 1993, 31, 853-858.
2. Genies, C.; Mercier, R.; Sillion, B.; Cornet, N.; Gebel, G; Pineri, M. Polymer 2001,42, 359-373.
3. Miyatake, K.; Hay, A. S.; J Polym Sci: Part A: Polym Chem Ed 2001, 39, 3211-3217.
4. Wang, F.; Hickner, M.; Kim, Y. S.; Zawodzinski, T. A.; McGrath, J. E. J Membr Sci 2002, 197, 231-242.
5. Faure, S.; Comet, N.; Gebel, G; Mercier, R.; Pineri, M.; Sillion, B.; in Proceedings of the Second International Symposium on New Materials for Fuel Cell and Modern Battery Systems, (Savadogo, O.; Roberge, P. R. eds.), Montreal, Canada, 1997, July 6-10, p. 818.
6. Nolte, R.; Ledjeff, K.; Bauer, M.; Mülhaupt, R. J Membr Sci 1993, 83, 211-220.
7. Kobayashi, T.; Rikukawa, M.; Sanui, K.; Ogata, N. Solid State Ionics 1998, 106, 219-225.
8. Glipa, X.; Haddad, M. E.; Jones, D. J.; Roziere, J. Solid State Ionics 1997, 97, 323-331.
9. Kerres, J.; Cui, W.; Reichle, S. J Polym Sci, Part A: Polym Chem Ed 1996, 34, 2421-2438.
10. Soczka-Guth, T.; Baurmeister, J.; Frank, G; Knauf, R. International Patent WO 1999,99/29763.
11. Zaidi, S. M. J.; Mikhailenko, S. D.; Robertson, G P.; Guiver, M. D.; Kaliaguine, S. J Membr Sci 2000, 173, 17-34.

12. Jones, D. J.; Rozière, J. J Membr Sci 2001, 185, 41-58.
13. Nunes, S. P.; Ruffmann, B.; Rikowski, E.; Vetter, S.; Richau, K. J Membr Sci 2002, 203, 215-225.
14. Wilhelm, F. G; Pünt, I. G M.; Van der Vegt, N. F. A.; Strathmann, H.; Wessling, M. J Membr Sci 2002, 199, 167-176.
15. Huang, R. Y. M.; Shao, P.; Burns, C. M.; Feng, X. J Appl Polym Sci 2001, 82, 2651-2660.
16. Helmer-Metzmann, F.; Osan, F.; Schneller, A.; Ritter, H.; Ledjeff, K.; Nolte, R.; Thorwirth, R. U.S. Patent 1995, U.S. Pat. No. 5,438,082.
17. Yen, S-P. S.; Narayanan, S. R.; Halpert, G; Graham, E.; Yavrouian, A. U. S. Patent 1998, U.S. Pat. No. 5,769,496.
18. Jian, X. G; Meng, Y Z.; Zheng, H. B. Chin. Pat. 93109180.2 (1993)
19. Jian, X. G; Meng, Y Z.; Zheng, H. B. Chin. Pat. 93109179.9 (1993)
20. Meng, Y; Hill, A. R.; Hay, A. S. J Polym Sci, Part A: Polym Chem Ed 1999, 37, 1781-1788.
21. Meng, Y. Z.; Hay, A. S.; Jian, X. G.; Tjong, S. C. J Appl Polym Sci 1998, 68, 137-143.
22. Dai, Y; Jian, X.; Liu, X.; Guiver, M. D. J Appl Polym Sci 2001, 79, 1685-1692.
23. Dai, Y; Jian, X.; Zhang, S.; Guiver, M. D. J Membr Sci 2002, 207, 189-197.

The invention claimed is:

1. Sulfonated poly(phthalazinones) consisting essentially of units of structural formula I

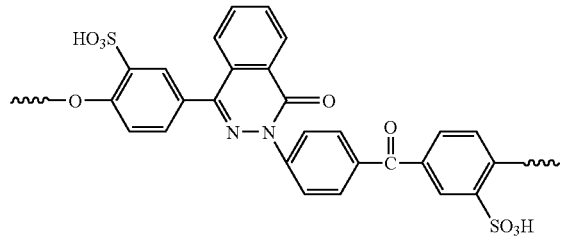

wherein the degree of sulfonation is in the range of 0.6 to 1.0.

2. Sulfonated poly(phthalazinones) consisting essentially of units of structural formula I as defined in claim 1, in the form of a membrane.

3. A process for the preparation of sulfonated poly(phthalazinones) consisting essentially of units of structural formula I as defined in claim 1, and having a degree of sulfonation in the range of 0.6 to 1.0, comprising reacting poly (phthalazinones) of formula II

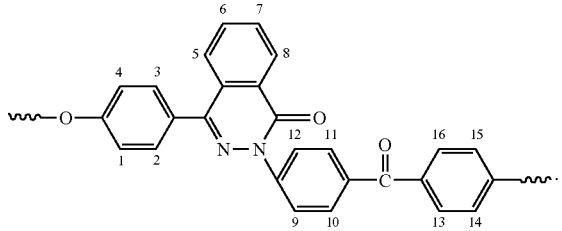

at room temperature with a sulfonating agent, wherein the sulfonating agent is a mixture of 95-98% concentrated sulfuric acid and 27-33% fuming sulfuric acid with different acid ratios in the range of fuming sulfuric acid to concentrated sulfuric acid of 5/5 to 7/3, wherein the degree of sulfonation is controlled by varying the ratio of concentrated sulfuric acid to fuming sulfuric acid and the reaction time.

4. A process according to claim 3, including the additional step of casting the sulfonated poly(phthalazinones) to form a membrane.

5. A membrane electrode assembly for use in a fuel cell comprising: (a) an anode, (b) a cathode; and (c) a solid polymer electrolyte membrane between said anode and said cathode, said solid polymer electrolyte membrane comprising a sulfonated poly(phthalazinone) consisting essentially of units of structural formula I as defined in claim 1, and having a degree of sulfonation in the range of 0.6 to 1.0.

6. A method of producing a fuel cell, comprising the steps of forming a solid polymer electrolyte membrane using the sulfonated poly(phthalazinone) consisting essentially of units of structural formula I as defined in claim 1, and having a degree of sulfonation in the range of 0.6 to 1.0; and assembling said solid electrolyte membrane between an anode and a cathode to provide a membrane electrode assembly.

* * * * *